(12) United States Patent
Allen et al.

(10) Patent No.: US 10,169,074 B2
(45) Date of Patent: Jan. 1, 2019

(54) MODEL DRIVEN OPTIMIZATION OF ANNOTATOR EXECUTION IN QUESTION ANSWERING SYSTEM

(71) Applicant: International Business Machines Corporation, Armonk, NY (US)

(72) Inventors: Corville O. Allen, Morrisville, NC (US); Bernadette A. Carter, Raleigh, NC (US); Rahul Ghosh, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 562 days.

(21) Appl. No.: 14/857,903

(22) Filed: Sep. 18, 2015

(65) Prior Publication Data

US 2016/0004561 A1   Jan. 7, 2016

Related U.S. Application Data

(63) Continuation of application No. 14/252,452, filed on Apr. 14, 2014.

(51) Int. Cl.
*G06F 7/00* (2006.01)
*G06F 9/48* (2006.01)
(Continued)

(52) U.S. Cl.
CPC ............. *G06F 9/48* (2013.01); *G06F 9/4881* (2013.01); *G06F 17/241* (2013.01); *G06F 17/30699* (2013.01); *G06N 5/041* (2013.01)

(58) Field of Classification Search
CPC .......... G06N 7/005; G06N 7/00; G06N 5/041; G06F 7/00; G06F 17/241; G06F 17/30699; G06F 9/48; G06F 9/4881; G06K 9/00288
(Continued)

(56) References Cited

U.S. PATENT DOCUMENTS 5,842,031 A   11/1998  Barker et al.
7,181,438 B1   2/2007  Szabo
(Continued)

FOREIGN PATENT DOCUMENTS

WO   WO2013/010159 A1   1/2013

OTHER PUBLICATIONS

Hu, "A Study on Question Answering System Using Integrated Retrieval Method," Doctoral Dissertation, Feb. 2006, at http://citeseerx.ist.psu.edu/viewdoc/download?doi=10.1.1.94.3790&rep=rep1&type=pdf.*
(Continued)

*Primary Examiner* — Cesar B Paula
*Assistant Examiner* — Jian Huang
(74) *Attorney, Agent, or Firm* — Francis Lammes; Stephen J. Walder, Jr.; Reza Sarbakhsh

(57) ABSTRACT

Mechanisms are provided for scheduling execution of pre-execution operations of an annotator of a question and answer (QA) system pipeline. A model is used to represent a system of annotators of the QA system pipeline, where the model represents each annotator as a node having one or more performance parameters indicating a performance of an execution of an annotator corresponding to the node. For each annotator in a set of annotators of the system of annotators, an effective response time for the annotator is calculated based on the performance parameters. A pre-execution start interval for a first annotator based on an effective response time of a second annotator is calculated where execution of the first annotator is sequentially after execution of the second annotator. Execution of pre-execution operations associated with the first annotator is scheduled based on the calculated pre-execution start interval for the first annotator.

6 Claims, 7 Drawing Sheets

(51) Int. Cl.
*G06F 17/24* (2006.01)
*G06N 5/04* (2006.01)
*G06F 17/30* (2006.01)
*G06N 7/00* (2006.01)

(58) Field of Classification Search
USPC .......................................................... 715/230
See application file for complete search history.

(56) References Cited

U.S. PATENT DOCUMENTS

| | | | |
|---|---|---|---|
| 8,849,835 | B1 | 9/2014 | Carmi et al. |
| 2003/0126136 | A1* | 7/2003 | Omoigui ............. G06F 17/3089 |
| 2003/0182310 | A1* | 9/2003 | Charnock ......... G06F 17/30716 |
| 2009/0287678 | A1 | 11/2009 | Brown et al. |
| 2010/0332470 | A1 | 12/2010 | Farkash et al. |
| 2011/0066587 | A1 | 3/2011 | Ferrucci et al. |
| 2011/0125734 | A1 | 5/2011 | Duboue et al. |
| 2011/0137851 | A1 | 6/2011 | Cavet et al. |
| 2012/0110047 | A1 | 5/2012 | Hildrum et al. |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |
| 2013/0128735 | A1 | 5/2013 | Li et al. |
| 2014/0079297 | A1 | 3/2014 | Tadayon et al. |
| 2014/0201126 | A1 | 7/2014 | Zadeh et al. |

OTHER PUBLICATIONS

"List of IBM Patents or Patent Applications Treated as Related", Sep. 18, 2015, 2 pages.

Biglari-Abhari, Morteza et al., "Improving Binary Compatibility in VLIW Machines through Compiler Assisted Dynamic Rescheduling", IEEE, 2000, pp. 386-393.

Gutsche, Ralf et al., "Method and System for Incremental Data Processing Workflows", An IP.com Prior Art Database Technical Disclosure, IPCOM000203248D, IP.com Electronic Publication Jan. 21, 2011, 6 pages.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Spi Dst et al., "Compiling Parallel Programs by Optimizing Performance", An IP.com Prior Art Database Technical Disclosure, IPCOM000161304D, IP.com Electronic Publication Dec. 9, 2007, 39 pages.

Yu, Chenggang et al., "PIPA: A High-Throughput Pipeline for Protein Function Annotation", IEEE, 2008 pp. 241-246.

Yuan, Michael J., "Watson and healthcare, How natural language processing and semantic search could revolutionize clinical decision support", IBM developerWorks, IBM Corporation, Apr. 12, 2011, 14 pages.

Stallings, William, "Queuing Analysis", Published online 2000, WilliamStallings.com/StudentSupport.html, 30 pages.

* cited by examiner

MODEL DRIVEN OPTIMIZATION OF ANNOTATOR EXECUTION IN QUESTION ANSWERING SYSTEM

This application is a continuation of application Ser. No. 14/252,452, filed Apr. 14, 2014, status pending.

BACKGROUND

The present application relates generally to an improved data processing apparatus and method and more specifically to mechanisms for performing model driven optimization of annotator execution in a question answering system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, is provided for scheduling execution of pre-execution operations of an annotator of a question and answer (QA) system pipeline. The method comprises using, by the data processing system, a model to represent a system of annotators of the QA system pipeline. The model represents each annotator in a set of annotators of the system of annotators as a node having one or more performance parameters for indicating a performance of an execution of an annotator corresponding to the node. The method further comprises determining, by the data processing system, for each annotator in the system of annotators, an effective response time for the annotator based on the one or more performance parameters. Moreover, the method comprises calculating, by the data processing system, a pre-execution start interval for a first annotator based on an effective response time of a second annotator. Execution of the first annotator is sequentially after execution of the second annotator. In addition, the method comprises scheduling, by the data processing system, execution of pre-execution operations associated with the first annotator based on the calculated pre-execution start interval for the first annotator.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
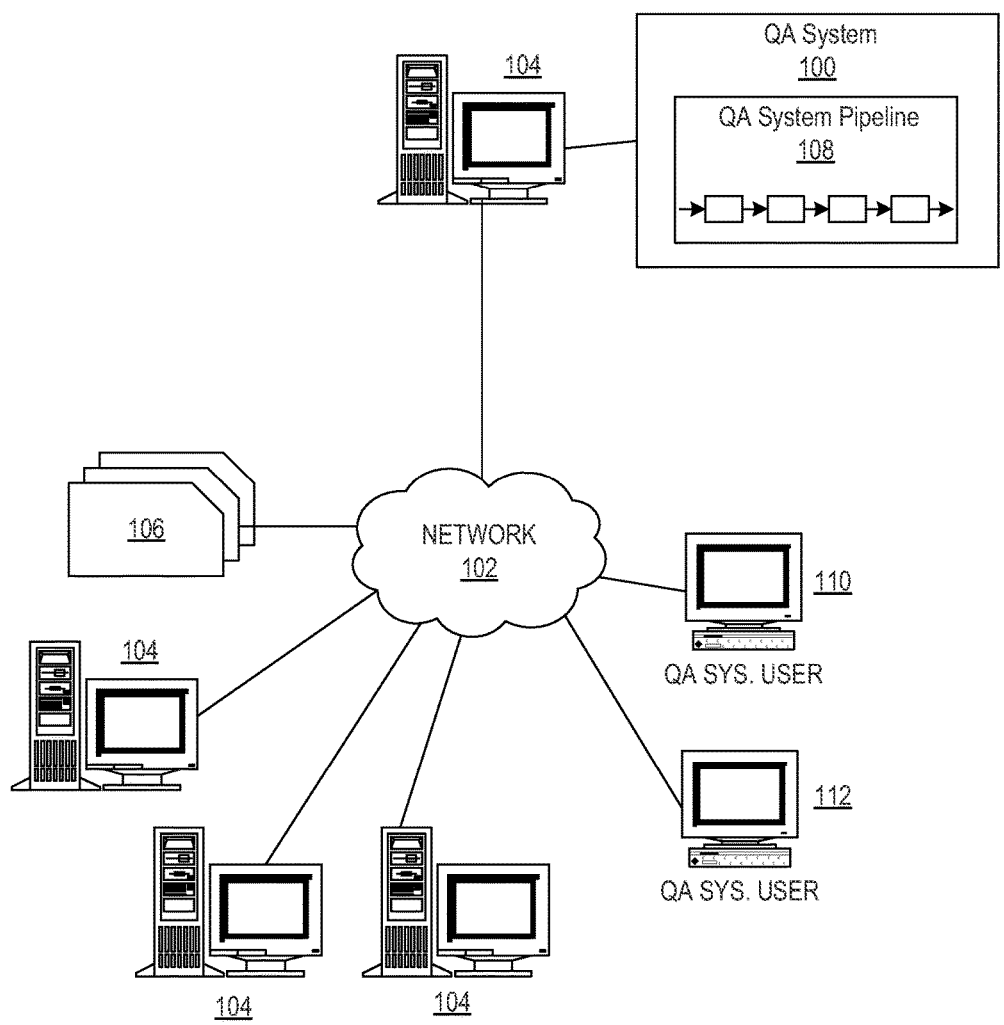
FIG. 1 depicts a schematic diagram of one illustrative embodiment of a question/answer creation (QA) system in a computer network.

In a question and answer (QA) system, such as the Watson™ QA system previously mentioned above, numerous annotators are used to analyze the input questions and the corpus of documents and other data used as a basis for generating answers to the input questions. An annotator is a program that takes a portion of input text, extracts structured information from it, and generates annotations, or metadata, that are attached by the annotator to the source/original text data. The term "annotation" refers to the process followed by the annotator and the resulting metadata that provides elements of structure that can be referenced or acted upon by other programs, annotators, or the like, that read and understand the annotated text data. Annotators may comprise logic configured in many different ways and for many different purposes. In general, annotators may look for particular words, combinations of words, perform context analysis for words, and the like, to identify the types of words in a portion of text, their purpose within the portion of text, e.g., parts of speech, types of information sought or being provided, and the like. Annotators may be generic, e.g., identifying nouns, names of persons, places, dates, etc., or specific to a particular purpose (e.g., identifying medical terms) or domain (e.g., identifying questions/content directed to pancreatic cancer diagnosis and treatment).

QA systems may be generic in nature or customized for a particular domain or subset of domains. A "domain" in the context of QA systems and the present description is a concept area, e.g., sports, financial industry, medical industry, legal concepts, etc. Domains may be defined at various granularities such that one domain may be a subset of a larger domain. For example, one domain may be "medical", a sub-domain may be "cancer", a sub-sub-domain may be "diagnosis and treatment," and yet another sub-sub-sub-domain may be "pancreatic cancer." QA systems may be configured to handle questions and provide answers of a particular domain or set of domains and sub-domains, possibly using a corpus of information that is specifically for that particular domain/sub-domains, e.g., medical records, journals, publications, etc. In such a case the QA system is trained specifically for the particular domains/sub-domains that it is intended to handle, including providing the QA system with annotators that are configured and trained for the particular domains/sub-domains.

Alternatively, a QA system may be more generic in nature such that it is configured to handle questions that may be directed to any domain or a large group of related and unrelated domains. In such a case, the QA system may have many different annotators that are configured to perform annotation operations either generically or with regard to a variety of different domains/sub-domains that may not be related to one another. The annotators may be used as part of a pre-processing operation of a corpus of content or during runtime operation as part of the hypothesis generation or other stages of a QA system pipeline when generating candidate answers to an input question.

Annotators may be provided as individual annotators or as a group of annotators treated as a single entity, referred to herein as an annotator "aggregate." A QA system pipeline, described hereafter, may have multiple annotators and/or annotator aggregates running concurrently. Moreover, some annotators and annotator aggregates of a QA system pipeline may have dependencies upon one another, or upon another element of the QA system pipeline, for providing some information or data prior to the dependent annotator or annotator aggregate executing. For example, in some embodiments, a downstream annotator/annotator aggregate (referred to hereafter as simply an "aggregate") may be dependent upon an upstream process that provides input data to the downstream annotator/aggregate. In addition, some annotators and aggregates may have various sub-systems associated with them that perform various preliminary operations prior to the annotators and aggregates operating on the data input to the annotators and aggregates, e.g., loading a corpora into memory so that the annotators/aggregates may operate on the corpora, initiating type maps used by the annotators/aggregates when analyzing the content of the loaded corpora, pre-loading certain other data used by the annotator/aggregate when performing its functions, or the like.

It has been determined that the operation of a QA system may be improved by expediting the execution of operations of sub-systems and upstream mechanisms upon which annotators and aggregates are dependent. However, in order to expedite such execution, it is important to know which sub-systems and upstream mechanisms the annotators and aggregates are dependent upon as well as the proper timing for performing these operations. By improving operation of the QA system pipeline by scheduling the performance of these "pre-execution" operations in accordance with determined dependencies and timing, the concurrent execution of annotators and aggregates is increased. However, one must also optimize the amount of concurrent execution of annotators and aggregates so as to take optimum advantage of the available resources without over-saturating the resources and making performance deteriorate.

The illustrative embodiments provide mechanisms for utilizing an open queuing network to approximate and model the response time associated with an annotator or aggregate. In this model, the group of annotators/aggregates of a QA system pipeline are modeled as a tandem queue in which each annotator/aggregate is a queue node representing a separate open queue in the tandem queue model. Response times for the various nodes in the model are determined and, based on the modeled response time, and the configuration of downstream annotators/aggregates, non-dependent sub-system operations are scheduled so as to optimize the overall response time for a given set of requests.

Thus, with the mechanisms of the illustrative embodiment, each annotator or aggregate of the QA system pipeline is defined as a sub-system and is designated as to whether they have one or more pre-execution operations that may be executed with the results of the pre-execution operations being stored/cached for use by the annotator/aggregate. The entire group of subsystems, i.e. the group of annotators and aggregates, are represented as a tandem queue (one queue providing an output to a next queue in the tandem queue)

with each subsystem being a queue in the tandem queue, however if a subsystem is large enough it may be modeled as a tandem queue in itself.

A model is generated to define and determine the average response time for each subsystem, referred to hereafter as the "effective response time." The effective response time of a subsystem (annotator/aggregate) in the model is used to determine when the pre-execution operations of the next subsystem (annotator/aggregate) in the model can begin executing so as to optimize the timing of the execution of the pre-execution operation and the subsequent subsystem. In determining when the pre-execution operations of the next subsystem, a calculation of the current execution time minus the effective response time of the previous subsystem is set equal to the pre-execution start interval. Thus, for example, if the current execution time of a subsystem, i.e. a point in model simulation time at which the next subsystem begins execution, is 15 seconds from a start point, and a previous subsystem's effective response time is 10 seconds, then the pre-execution start interval is 5 seconds (15 seconds minus 10 seconds). This process may be performed for each subsystem of the model to generate pre-execution start intervals for each subsystem of the model.

During runtime operation, the pre-execution start intervals may be used for scheduling the pre-execution operations of the annotators/aggregates. In executing the pre-execution operations, the pre-execution operation checks for pre-execution input data and starts the pre-execution operation in response to the pre-execution input data being available. In some embodiments, pre-execution input data may be placed in a queue structure from which the pre-execution input data is loaded and annotators/aggregates are executed on demand but not before the most optimal pre-execution start interval. Once the pre-execution operation is executed, the resulting data, referred to as "intermediate data" herein, is stored/cached for use by the annotator/aggregate when the annotator/aggregate is fully executed. The annotator/aggregate is then executed fully in accordance with its normal operation.

As a result, the execution of the pre-execution operations of the annotators/aggregates is scheduled earlier and can be performed in parallel with other annotator/aggregate operations being performed by other annotators/aggregates. Thus, the overall system of annotators/aggregates execute faster and use processor/memory as well as other system resources at an optimal time.

However, it should be appreciated that there may conditions under which the number of pre-execution operations that may run in parallel may consume too many resources, e.g., memory, processor cycles, or the like, and may negatively affect performance. The illustrative embodiments may implement concurrency control logic for controlling the level of concurrency of the pre-execution operations by controlling which annotator pre-execution operations are performed in parallel. For example, in one illustrative embodiment, the concurrency control may identify and execute in parallel the pre-execution operations of annotators that are some "distance" apart. For example, if annotator #1 is associated with annotator #2, e.g., provides an input into annotator #2 or otherwise annotator #2 operates on the output of annotator #1, and annotator #2 is associated with annotator #3, annotator #3 is associated with annotator #4, and all of them can be run in parallel, the concurrency control may execute the pre-execution operations of annotator #1 in parallel with the pre-execution operations of annotator #3 first and then the pre-execution operations of annotator #2 are executed in parallel with the pre-execution operations of annotator #4. Of course, this is in the steady-state when each annotator has enough data to run.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
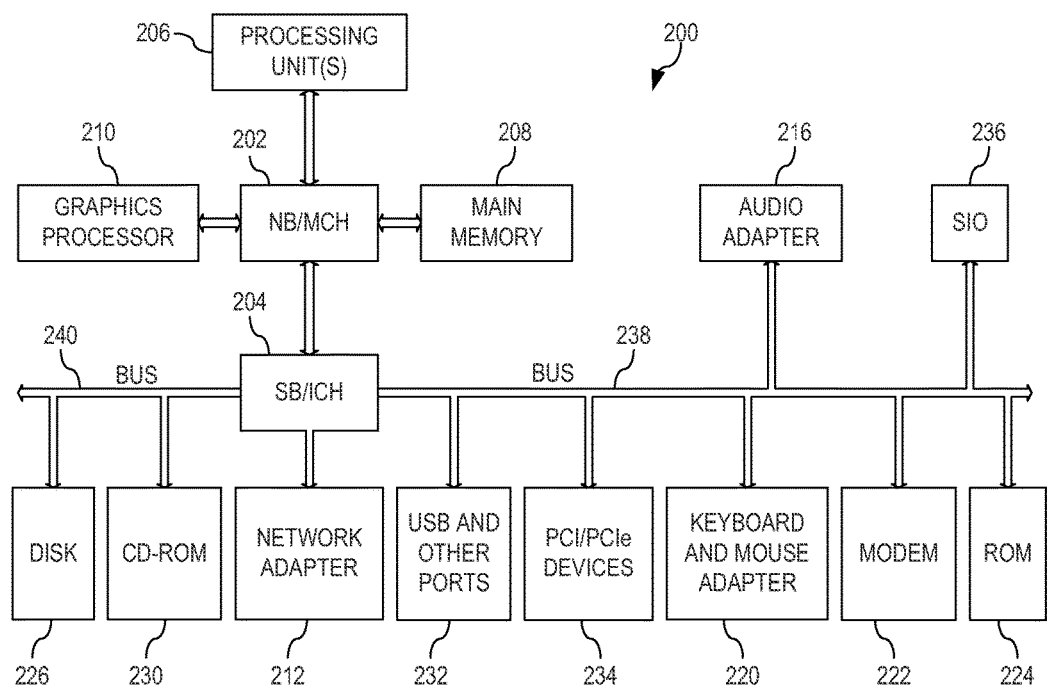
FIG. 2 is a block diagram of an example data processing system in which aspects of the illustrative embodiments may be implemented.
Figure 3:
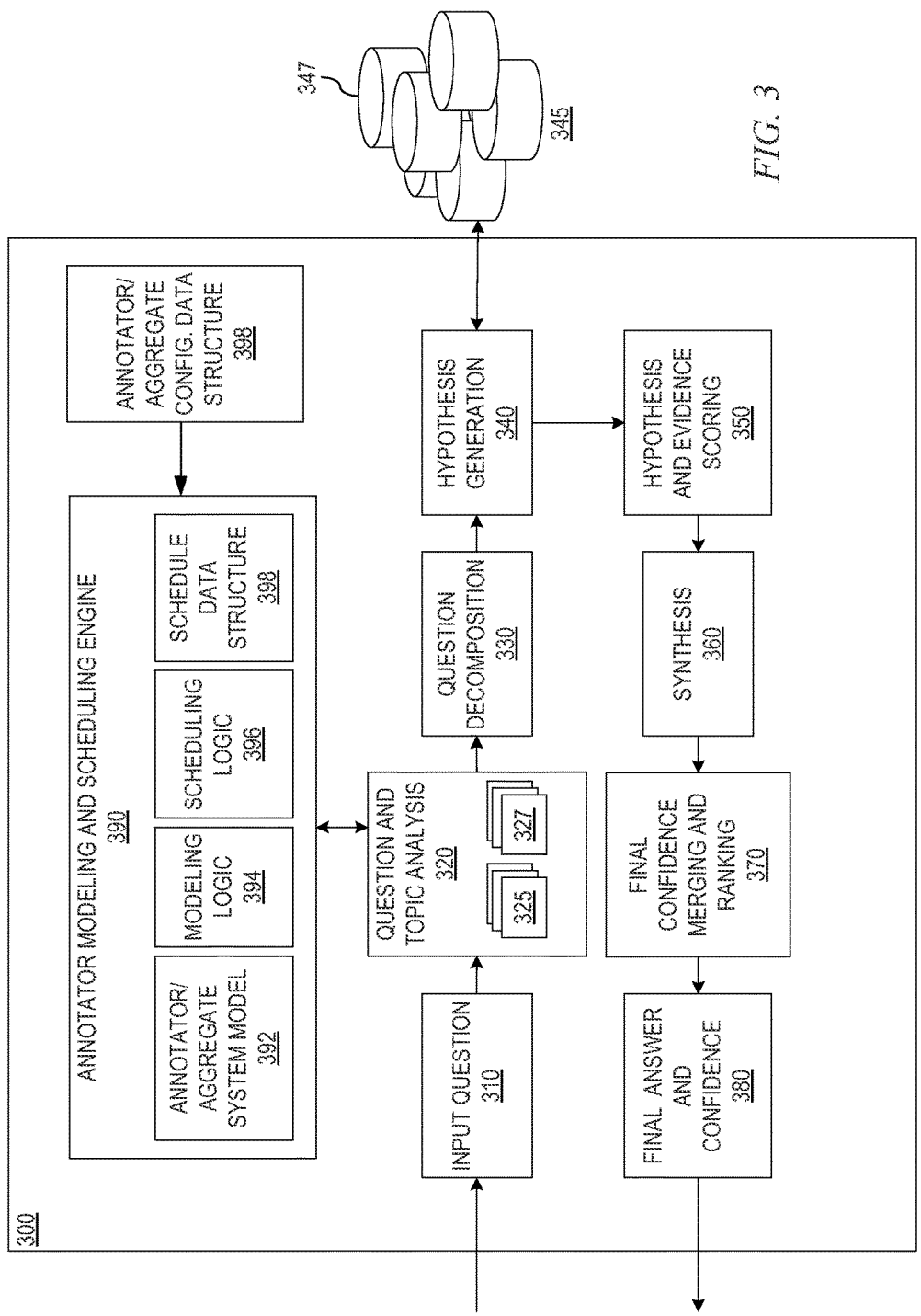
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to the execution of the annotators/aggregates of the QA system. More specifically, the illustrative embodiments provide mechanisms for scheduling the execution of pre-execution operations of annotators/aggregates so at to optimize the timing and resource usage of annotators/aggregates when performing functions for hypothesis generation, evidence evaluation, and the like.

Since the mechanisms of the illustrative embodiments operate to improve the operation of a QA system, it is important to first have an understanding of how question and answer generation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developer Works, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 500, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

As shown in FIG. 3, in accordance the illustrative embodiments, as part of the question and topic analysis stage 320, annotators 325 are utilized to perform the feature extraction and annotation. That is, the annotations identify the types of features extracted from the input question, e.g., nouns, verbs, places, names, values, or domain specific types. As mentioned above, the annotators 325 may comprise annotators of various domains including generic all inclusive domains, specialized domains for particular industries, topics, and the like, or any granularity of domain between general and specialized. The annotations may be stored as separate sets of annotations 327, associated with the input question, generated by each annotator 325. The annotations 327 may be stored as separate data structures from the input question or may be stored as metadata of the input question. Thus, a first set of annotations may comprise annotations generated by an annotator configured to annotate financial terms in input questions. A second set of annotations may comprise annotations generated by an annotator configured to perform English language parts of speech identification. It should be appreciated that an annotator may actually not generate any annotations at all if the input question does not comprise terms or patterns of content matching those terms and patterns of content for which the annotator is configured to identify and annotate.

In one illustrative embodiment, the annotations may comprise parts of speech, definitions and/or types of terms, and expected context information. The parts of speech portion of an annotation identifies whether the term, phrase, or portion of text is a noun, verb, preposition, prepositional phrase, adverb, adjective, or other part of speech of a particular language. The definitions annotations provide the definitions of terms or patterns of terms from the viewpoint of the domain for which the annotation is configured. Thus, in one annotator a term may have a first definition, and in another annotator, the same term may have a second, different definition. The same is true of type designations, where the type may be domain specific. Furthermore, the type may designate such things as the focus of the input question, the lexical answer type (LAT) of the question, and other structural annotations associated with the terms, pattern of terms, or the like. The expected context information annotations comprise the expected domain of the question determined from analysis of the various parts of the question, e.g., that the question is determined to be in the financial, medical, oncology, English grammar, or other type of domain (subject matter area) that is expected to be the most likely area to provide a correct answer for the question. Various types of annotators may be used when analyzing the input question and/or the corpus.

For example, consider the statement "John should have short AMG." With a general purpose annotator, this statement may be parsed and annotated in the following manner (with annotations indicated in parenthesis): "John (Noun) should have (Verb) short (Noun) AMG (Unknown, Noun)". A financial domain based annotator may recognize the term "short" to be a verb/adverb part of speech indicating the operation of "selling commodities high, buy low to return to holdings" or "sells borrowed stocks." Furthermore, the financial domain annotator may be configured to identify particular types of terms corresponding to the financial industry, such as stock names, mutual fund names, stock exchanges, and the like. Thus, the financial domain annotator may annotate the same statement as follows: "John (Noun) should have (Verb) short (Verb) AMG (Noun, stock name)." Further annotators may be used to determine the domain of an input question of document/portion of content so as to determine which set of annotators to utilized or prioritize, e.g., generic annotator versus domain specific annotator.

It should be appreciated that while the illustrative embodiments are described with reference to annotators used in the question and topic analysis stage 320 of the QA system pipeline 300, the illustrative embodiments are not limited to such and may operate with regard to annotators in any stage of the QA system pipeline 300. For example, annotators may be utilized in the hypothesis generation stage 340, evidence scoring stage 350, or the like, and may have their operation optimized using the mechanisms of the illustrative embodiments. Any annotator or group of annotators (an "aggregate") of a QA system pipeline 300 may be optimized using the mechanisms of the illustrative embodiments without departing from the spirit and scope of the illustrative embodiments.

As mentioned above, the illustrative embodiments provide mechanisms for utilizing an open queuing network to approximate and model the response time associated with an annotator or aggregate of annotators (referred to herein as an "aggregate"). An "open queuing network" is a network of queues in which the jobs may be received from outside of the queuing network and the number and rate of the job input is variable. The queues of an open queuing network are characterized by their service rates for processing jobs, with the throughput of the open queuing network being a combination of the service rates of the individual queues.

Referring again to FIG. 3, the mechanisms of the illustrative embodiments may be implemented as an annotator modeling and scheduling engine 390 which may operate in conjunction with the annotators 325 (which may also comprise aggregates as well) of the question and topic analysis stage 320, or other stage in other possible implementations. The annotator modeling and scheduling engine 390 may comprise logic, e.g., modeling logic 394 and scheduling logic 396, implemented in hardware, software executed on hardware, or a combination of hardware and software executed on hardware, for modeling the annotators 325 as a tandem queue in which each annotator/aggregate is a queue node representing a separate open queue in the tandem queue model. The modeling logic 394 may further determine response times and pre-execution start intervals for the various nodes in the model 392 which may then be used by the scheduling logic 396 to determine appropriate scheduling of pre-execution operations of annotators/aggregates based on the modeled response time, and the configuration of downstream annotators/aggregates, so as to optimize the overall response time for the annotators/aggregates of the question and topic analysis stage 320.

With the mechanisms of the illustrative embodiment, each annotator or aggregate 325 is defined as a sub-system and has its configuration designated, such as in annotator/aggregate configuration data structure 397, as to whether they have one or more pre-execution operations that may be executed with the results of the pre-execution operations being stored/cached for use by the annotator/aggregate 325. The entire group of subsystems, i.e. the group of annotators and aggregates, are represented as a tandem open queue network in a model 392 with each subsystem being a queue in the tandem open queue network. In some cases, a subsystem may be large enough, i.e. an aggregate may have a large enough number of annotators, that it may be modeled as a tandem queue in itself. Thus, a nested tandem queue networking model may be generated in this manner.

The model 392 of the annotators/aggregates is generated and simulated by the modeling logic 396 using simulated job workloads to define and determine the average response time for each subsystem, i.e. the "effective response time." The effective response time of a subsystem (annotator/aggregate) in the model 392 is used to determine when the pre-execution operations of the next subsystem (annotator/aggregate) in the model 392 can begin executing so as to optimize the timing of the execution of the pre-execution operation and the subsequent subsystem. In determining when the pre-execution operations of the next subsystem may begin execution, a calculation of the current execution time minus the effective response time of the previous subsystem is set equal to the pre-execution start interval.

This process may be performed for each subsystem of the model 392 to generate pre-execution start intervals for each subsystem of the model 392. Moreover, this process may be performed for various types of workloads, e.g., workloads for different domains. The result is a set of scheduling parameters that may be stored in a scheduling data structure 398 for use in scheduling the operation of annotators/aggregates when performing operations during runtime. The scheduling data structure 398 may store, for example, for each of the annotators/aggregates, one or more scheduling parameters specifying effective response time of the annotator/aggregate, pre-execution start interval for the annotator/aggregate, or the like, and may store multiple sets of such parameters keyed to other characteristics of input to the annotator/aggregate, e.g., specified domain of the input data (such as the specified domain of the input question, domain of the document or corpora being processed, or the like).

This scheduling data structure 398 may be accessed by scheduling logic 396 of the annotator modeling and scheduling engine 390 when scheduling the execution of the annotators/aggregates for a particular input question and/or corpora. That is, during the operation of the question and topic analysis stage 320, certain annotators/aggregates may always be executed, e.g., generic annotators/aggregates, while other annotators/aggregates may be domain dependent or dependent upon results generated by other annotators. In either case, the scheduling of the annotators/aggregates may be performed based on the determined response times and pre-execution start intervals such that if a particular annotator/aggregate is to be scheduled for execution, the pre-execution start interval for the particular annotator/aggregate may be used to schedule the execution of the pre-execution operations for the annotator/aggregate. Thus, when the annotator/aggregate is scheduled to execute, the pre-execution operations have been already completed. Such pre-execution operations may be performed in parallel with the operations of other annotators/aggregates since these pre-execution operations are non-dependent upon the results generated by the earlier executed annotators/aggregates.

Hence, during runtime operation, the pre-execution start intervals may be used for scheduling the pre-execution operations of the annotators/aggregates, e.g., pre-loading, into memory, of a corpora upon which the annotator will operate, pre-loading into memory other data used by the annotator/aggregate such as type maps and the like, or any other operation that is a not dependent upon other annotators/aggregate output results. In executing the pre-execution operations, the pre-execution operation checks for pre-execution input data and starts the pre-execution operation in response to the pre-execution input data being available. If the pre-execution input data is not available, then operation continues to check until the pre-execution input data is available at which time the pre-execution operation is initiated. In some embodiments, pre-execution input data may be placed in a queue structure (not shown) from which the pre-execution input data is loaded and annotators/aggregates are executed on demand but not before the most optimal pre-execution start interval. Once the pre-execution operation is executed, the resulting intermediate data is stored/cached for use by the annotator/aggregate when the annotator/aggregate is fully executed. The annotator/aggregate is then executed fully in accordance with its normal operation.

Figure 4A:
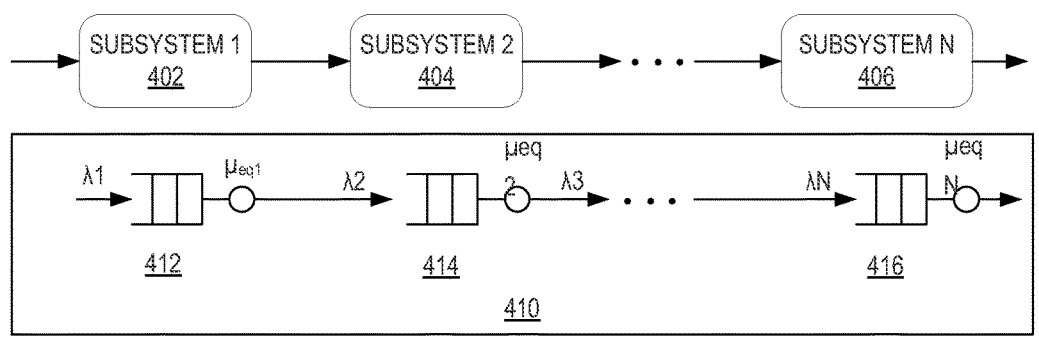
FIG. 4A illustrates one example of a tandem open queuing network model of a system of annotators in accordance with one illustrative embodiment.

As mentioned above, the system of annotators/aggregates is modeled as a tandem open queuing network. FIG. 4A illustrates one example of a tandem open queuing network model of a system of annotators in accordance with one illustrative embodiment. As shown in FIG. 4A, each annotator/aggregate of a QA system pipeline has corresponding configuration data as input to the modeling logic which uses this configuration data to model each annotator/aggregate as a subsystem 402-406 in the model. The configuration data specifies whether the annotator/aggregate has any pre-execution operations that are independent of other annotators/aggregates and can be executed such that the results of the pre-execution operations may be stored/cached. Thus, it is known for each annotator/aggregate whether the annotator/aggregate has any pre-execution operations that may be optimized by the mechanisms of the illustrative embodiments.

As shown in FIG. 4A, the subsystems 402-406 are modeled as a tandem open queue network 410 where each subsystem 402-406 is represented as a separate queue 412-416 in the tandem open queue network 410. A model is developed to define and determine the average response time for each subsystem, i.e. the effective response time. In generating this model for determining the average response time for each subsystem, the end-to-end mean or average response time of the system as a whole is the sum of the individual subsystem response times. For a single equivalent queue, the average response time may be calculated using Little's Law in the following manner. Denote E[R] to be the average response time, or effective response time, where R is the response time variable. Denote $\mu_{eq}$ to be the equivalent service rate (e.g., in jobs/sec) and $\lambda$ to be the arrival rate (e.g., in jobs/sec). The effective response time E[R] is equal to $1/(\mu_{eq}-\lambda)$. The values to be used in these relations may be obtained, for example, by profiling each annotator and the QA system pipeline as a whole, and measuring the values of these variables over time. Simulations may be used when no empirical data is available. Branch probabilities for branching from one annotator operation to another, and which affect the arrival rate into each annotator which in turn affects the response time, can also be measured over time or simulated by looking at how data routes among the different annotators, such as by tagging the data and tracking the data routes based on the tags.

The effective response time calculated using this model of the system and each of the subsystems is used to calculate when the pre-execution of a next subsystem (annotator/aggregate) should begin to optimize the execution of the pre-execution operations for this next subsystem. As mentioned above, in one illustrative embodiment, this pre-execution start interval may be calculated as the difference between the current execution time, or the start time of the next subsystem, and the effective response time of the previous subsystem.

Figure 4B:
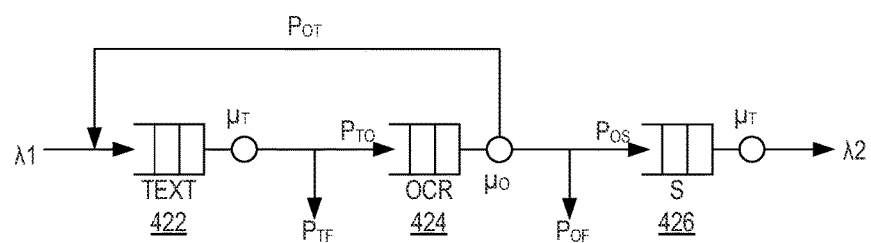
FIG. 4B illustrates one example of a tandem open queue model of a subsystem in accordance with one illustrative embodiment.

With reference again to FIG. 4A, as shown each of subsystems 402-406 are modeled as a separate queue 412-416. Each of these separate subsystems 402-406 may further be modeled as an open queuing network as shown in FIG. 4B. In FIG. 4B, a subsystem, e.g., subsystem 412 in FIG. 4A, may comprise a plurality of annotators (or "stations"), each represented by a single queue structure 422-426 having corresponding service rates $\mu_T$, $\mu_O$, $\mu_S$, etc. which may be specified, for example, as jobs/second or another suitable service rate metric. The arrival rate of jobs into this subsystem 412 is represented by the value $\lambda_1$, which may be in jobs/sec or other suitable arrival rate metric, for example. The arrival rate $\lambda_2$ of a next subsystem, e.g., subsystem 414 in FIG. 4A, in the model is equal to the output rate of the present subsystem 412. Branching probabilities $P_{TO}$, $P_{OT}$, $P_{TF}$, $P_{OS}$, $P_{OF}$ represent the probability that the operation of the station will result in a branch of execution to a particular other station of the subsystem. The branching probabilities can be experimentally measured over time by observing how the data routes across different stations. The subscripts of the branching probabilities indicate the stations. For example, the probability that execution will branch to station S from station O is given by $P_{OS}$. These branching probabilities affect $\mu_{eq}$ as well as the overall response time.

Figure 4C:
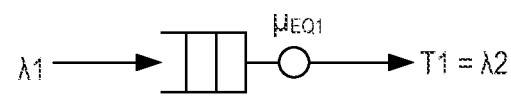
FIG. 4C illustrates one example of a single equivalent queue representation for the tandem open queue model of FIG. 4B in accordance with one illustrative embodiment.

The subsystem as a whole may be represented as a single equivalent queue representation as shown in FIG. 4C. That is, jobs arrive into the single equivalent queue at an arrival rate of $\lambda_1$ and the single equivalent queue has a service rate of $\mu_{eq1}$ which results in the output of the subsystem being provided at time T1 which is equal to the arrival rate $\lambda_2$ at the next subsystem.

Thus, as shown in FIG. 4B, a tandem open queue model of a subsystem may be utilized to represent each of the subsystems in the model of the annotators/aggregates which may then be represented as a single equivalent queue representation as shown in FIG. 4C. Each model of the subsystem, such as shown in FIG. 4C, may be combined to generate a tandem open queue model of the system as a whole, as shown in FIG. 4A.

Figure 4D:
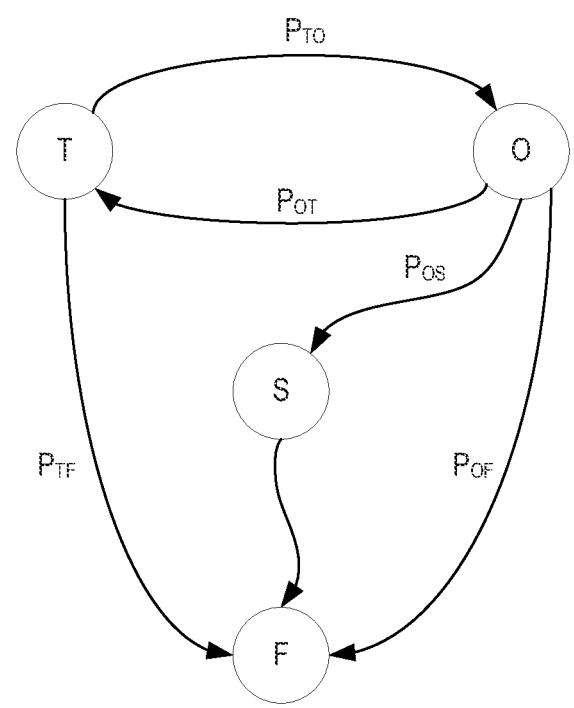
FIG. 4D illustrates one example of a model of a system as a discrete time Markov chain (DTMC) model in which the states of the DTMC are individual subsystems and the transitions between the states, or subsystems, are represented by the branching probabilities in accordance with one illustrative embodiment.

Furthermore, as shown in FIG. 4D, the overall system model may be represented as a discrete time Markov chain (DTMC) model in which the states of the DTMC are individual subsystems and the transitions between the states, or subsystems, are represented by the branching probabilities. The DTMC model shown in FIG. 4D is a DTMC model for processing a single job through the example subsystem shown in FIG. 4B. DTMC models are generally known in the art as being mathematical systems that undergo transitions from one state to another in a state space under a random process characterized in that the next state depends only on the current state and not on the sequence of events that preceded it. While DTMCs may be generally known in the art, the specific implementation of a DTMC to represent a system of annotators/aggregates of a QA system with each state of the DTMC being a subsystem (annotator/aggregate) of a QA system and transitions between these subsystems being represented by branching probabilities has not been implemented prior to the present invention.

By modeling the annotators/aggregates as subsystems in which each subsystem is represented by a queue in a tandem open queue network (which represents the system of annotators/aggregates as a whole) the effective response times of each of the annotators/aggregates may be calculated and used to determine the pre-execution start intervals for subsequent annotators/aggregates based on the effective response times of the prior annotator/aggregate. Thus, if it is known that aggregator B follows aggregator A in processing a particular job, and it is known that aggregated A has an effective response time of 10 seconds while aggregator B will start execution at 15 seconds, then if aggregator B has any pre-execution operations that may be performed independently with the results stored/cached for use by aggregator B, these pre-execution operations may be scheduled to being 5 seconds earlier than the execution of aggregator B. Similarly, if it is known that aggregator C then begins execution at a 30 second time point, and aggregator B has an effective response time of 10 seconds, then aggregator C may likewise have its pre-execution operations scheduled to being execution 5 seconds earlier than the start time of aggregator C, i.e. aggregator B starts execution at 15 seconds, its effective response time is 10 seconds which means that it will complete execution at 25 seconds giving a 5 second window before aggregator C is scheduled to execute and in which the pre-execution operations may be executing in preparation for the start of aggregator C.

As mentioned above, the model of the annotators/aggregators may be used to generate effective response times for the various annotators/aggregators as well as pre-execution start intervals for the annotators/aggregators which may be stored in a scheduling data structure. The scheduling data structure may be accessed by annotator/aggregate scheduling logic to establish a schedule of execution times of the annotators/aggregates of the various stages of the QA system pipeline including scheduling pre-execution operations to execute at the determined pre-execution start intervals prior to their corresponding annotator/aggregator start time. As a result, the pre-execution operations are performed earlier in time in preparation of the execution of the corresponding annotator/aggregator, thereby reducing wasted processor cycles and optimizing the use of system resources.

As an additional benefit, the calculated effective response times may be used to identify bottlenecks within the QA system pipelines' annotators/aggregates. That is, if a particular annotator/aggregate's effective response time is larger than a predetermined threshold value, or is more than a predetermined percentage greater than other annotators/aggregates used by the QA system pipeline, this may be indicative of a bottleneck in the processing of jobs through the annotators/aggregates. Logic may be provided in the annotator modeling and scheduling engine 390 for identifying such bottlenecks by comparing the calculated effective response times to one or more predetermined thresholds, or to effective response times of other annotators/aggregates, to an average of effective response times of annotators/aggregates, or the like. If a potential bottleneck is identified through such a comparison, e.g. an effective response time greater than the threshold, an effective response time that is more than a predetermined percentage higher than other annotators/aggregates or the average of effective response times of other annotators/aggregates, then this bottleneck may be flagged or otherwise identified in the scheduling data structure by storing an indicator of such a bottleneck in association with an entry for the annotator/aggregate and a notification may be sent to an administrator identifying the potential bottleneck.

Thus, the illustrative embodiments provide mechanisms for optimizing the scheduling of pre-execution operations of annotators/aggregates so as to take into consideration the effective response times of the annotators/aggregates and their corresponding preceding annotators/aggregates. The pre-execution operations may be scheduled such that their operations are completed prior to the fully execution of the corresponding annotator/aggregate thereby reducing the time required for the annotators/aggregates to complete execution. As a result, the overall performance of the annotators/aggregates and the QA system pipeline as a whole is improved.

Figure 5:
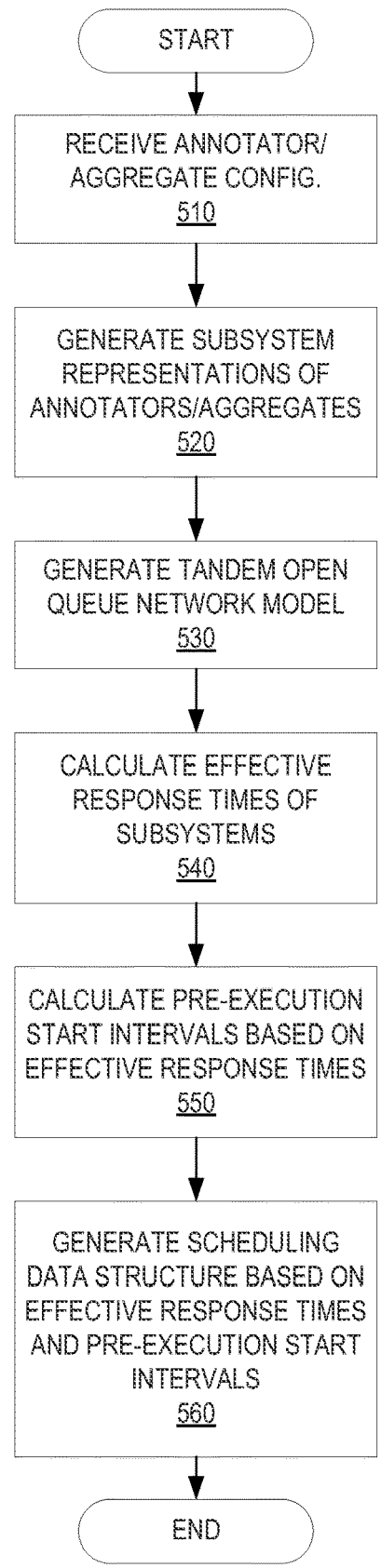
FIG. 5 is a flowchart outlining an example operation for determining the effective response time and pre-execution start interval for annotators/aggregates in accordance with one illustrative embodiment.

FIG. 5 is a flowchart outlining an example operation for determining the effective response time and pre-execution start interval for annotators/aggregates in accordance with one illustrative embodiment. As shown in FIG. 5, the operation starts with receiving annotator/aggregate configuration information (step 510). The annotator/aggregate configuration information is used to generate subsystem representations for each of the annotators/aggregates with annotators/aggregates having pre-execution operations that can be optimized being identified (step 520). A tandem open queue network model of a system of annotators/aggregates is generated based on the subsystem representations in which each subsystem is represented as a separate queue in the model (step 530). The effective response time of each subsystem in the model is calculated based on the arrival rate into the subsystem and the service rate of the subsystem (step 540). Based on the effective response times and the configuration of the annotators/aggregates of the system, the pre-execution start intervals for annotators/aggregates in the system that have pre-execution operations that may be executed independently of other annotators/aggregates are calculated (step 550). The resulting effective response times, pre-execution start intervals, and configuration data are stored in a scheduling data structure for use in scheduling annotators/aggregates during runtime operation (step 560). The operation then terminates.

Figure 6:
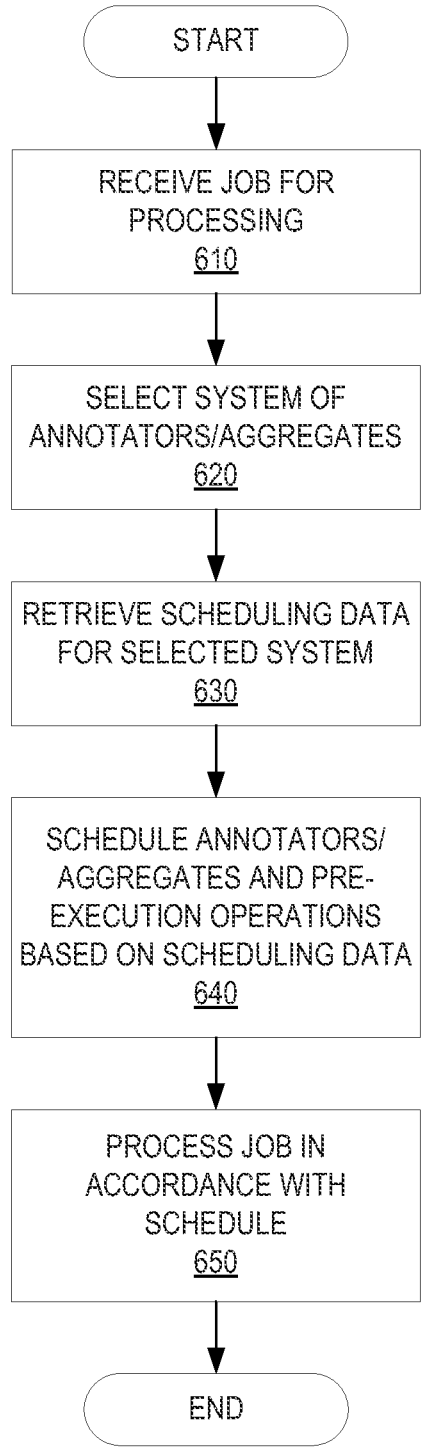
FIG. 6 is a flowchart outlining an example operation for scheduling the operation of annotators/aggregates in accordance with one illustrative embodiment.

FIG. 6 is a flowchart outlining an example operation for scheduling the operation of annotators/aggregates in accordance with one illustrative embodiment. As shown in FIG. 6, the operation starts by receiving a job to be processed by a system of annotators/aggregates (step 610). A corresponding system of annotators/aggregates is identified for the particular job, e.g., generic set of annotators/aggregates, domain specific set of annotators/aggregates based on the domain of the job to be performed, a combination of generic and domain specific annotators/aggregates, or the like (step 620). The corresponding scheduling data for the set of annotators/aggregates is retrieved from a scheduling data structure (step 630). The effective response times and pre-execution start intervals for the annotators/aggregates in the set of annotators/aggregates are used to schedule the execution of the annotators/aggregates and any pre-execution operations for the annotators/aggregates (step 640). The job is then processed by the annotators/aggregates in accordance with the specified schedule (step 650) and the operation terminates.

It should be noted that while the illustrative embodiments have been described in terms of particular models and calculations, the illustrative embodiments are not limited to such. Rather, any model and set of calculations that permit the determination of a pre-execution start interval for pre-execution operations of annotators/aggregators may be used without departing from the spirit and scope of the illustrative embodiments. That is, for example, rather than using a tandem open queue network to represent the system of annotators/aggregates, a different model may be utilized that permits the calculation of pre-execution start intervals. Moreover, rather than using a DTMC model to represent a system of annotators/aggregates, other state diagrams or models may be utilized as well. Furthermore, other equations and calculations for calculating the effective response times of the various annotators/aggregates and corresponding pre-execution start intervals may be used as well. Thus, the illustrative embodiments described herein should not be construed as limiting on the claims set forth hereafter.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for scheduling execution of pre-execution operations of an annotator of a question and answer (QA) system pipeline, the method comprising:
   using, by the data processing system, a model to represent a system of annotators of the QA system pipeline, wherein the model represents each annotator in the system of annotators as a node having one or more performance parameters for indicating a performance of an execution of an annotator corresponding to the node, wherein each annotator in the s stem of annotators is a program that takes a portion of unstructured input text, extracts structured information from the portion of the unstructured input text, and generates annotations or metadata that are attached by the annotator to a source of the unstructured input text, wherein, for each node in the model, the one or more performance parameters corresponding to the node comprise an arrival rate parameter and a service rate parameter of the annotator associated with the node, wherein the arrival rate parameter indicates a number of jobs arriving in the node per second, and wherein the service rate parameter indicates a number of jobs being serviced by the node per second;
   determining, by the data processing system, for each annotator in a set of annotators of the system of annotators, an effective response time for the annotator based on the one or more performance parameters;
   calculating, by the data processing system, a pre-execution start interval for a first annotator based on an effective response time of a second annotator, wherein execution of the first annotator is sequentially after execution of the second annotator; and
   scheduling, by the data processing system, execution of pre-execution operations associated with the first annotator based on the calculated pre-execution start interval for the first annotator.

2. The method of claim 1, wherein at least one node in the model represents a plurality of annotators comprising an aggregate annotator.

3. The method of claim 1, wherein the system is a tandem open queuing network in which each node in the model is modeled as a queue in the tandem open queuing network.

4. The method of claim 1, wherein each annotator of the QA system pipeline is defined, in a data structure, as a sub-system of the QA system pipeline and is designated as either having or not having one or more non-dependent pre-execution operations that may be executed with the results of the one or more non-dependent pre-execution operations being stored/cached for use by the annotator, and wherein scheduling execution of pre-execution operations associated with the first annotator is performed in response to the data structure indicating that the pre-execution operations associated with the first annotator are non-dependent pre-execution operations.

5. The method of claim 1, wherein calculating the pre-execution start interval for the first annotator based on an effective response time of the second annotator comprises calculating the pre-execution start interval based on a difference of a current execution time and an effective response time of the second annotator.

6. The method of claim 1, wherein the scheduling generates a scheduling data structure, and wherein the method further comprises:
   receiving a job for processing by the QA system pipeline;
   selecting a set of annotators in the system of annotators to execute the job, the set of annotators comprising the first annotator and the second annotator;
   scheduling the set of annotators, including the pre-execution operation of the first annotator, based on the scheduling data structure; and
   processing the job based on the scheduling of the set of annotators.

* * * * *